Figure 1:
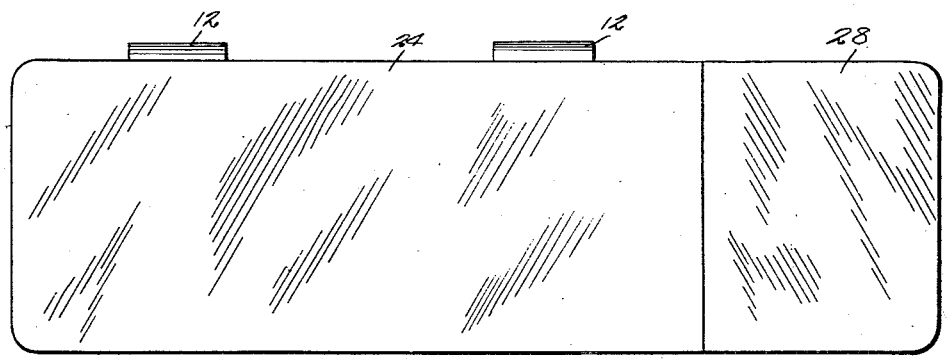

April 12, 1955     D. P. TAGLIAFERRI     2,705,904

REAR VIEW MIRROR

Filed July 18, 1951

D. P. Tagliaferri
Inventor

By    C. A. Snow & Co.

Attorneys.

United States Patent Office 2,705,904
Patented Apr. 12, 1955

2,705,904

REAR VIEW MIRROR

Dominick P. Tagliaferri, Utica, N. Y.

Application July 18, 1951, Serial No. 237,368

3 Claims. (Cl. 88—37)

This invention relates to a rear view mirror of the type commonly employed on the interior of a motor vehicle for enabling the operator of the vehicle to see reflections of objects to the rear of the vehicle.

The primary object of this invention is to enable the operator of a vehicle not only to see reflections of objects to the rear of the vehicle, but also the reflections of objects to the side of the vehicle adjacent which the steering wheel is located.

Another object is to enable the device to be readily mounted on the conventional rear view mirror commonly supplied as standard equipment on vehicles.

The above and other objects may be attained by employing this invention which embodies among its features a support having on one face thereof outwardly extending cushions, an elongated reflector secured adjacent one end to the support and at its opposite end to a cushion, and a reflector of less area secured to the support in abutting relation to the first mentioned reflector and supported on the cushion at the opposite end of the support to produce a rear view mirror in which reflections of objects approaching from the rear of the vehicle and passing to one side of the vehicle may be seen.

Other features include hooks carried by the support for detachably mounting the device on the conventional rear view mirror commonly supplied as standard equipment on vehicles.

Figure 2:
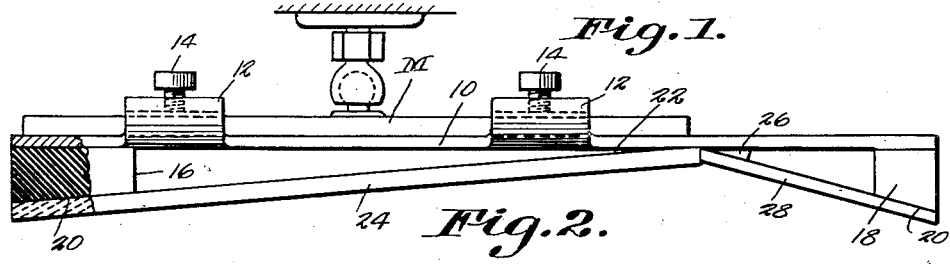
Figure 3:
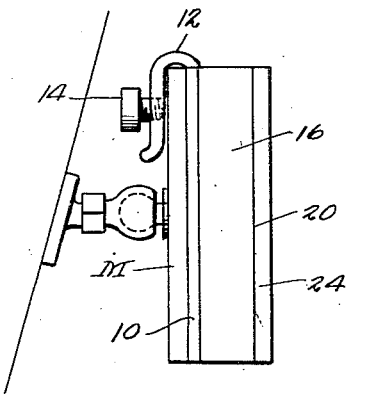
Figure 4:
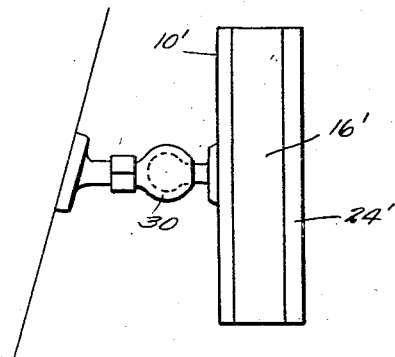

In the drawings,

Fig. 1 is a face view of a rear view mirror embodying the features of this invention, Fig. 2 is a top plan view of the mirror illustrated in Fig. 1, Fig. 3 is an end view of the mirror illustrated in Fig. 1, and Fig. 4 is a view similar to Fig. 3 showing a modified form of mounting for the rear view mirror.

Referring to the drawings in detail, this improved rear view mirror comprises an elongated substantially rectangular supporting plate designated 10 having integral hooks 12 carried by its upper end which are provided with threaded openings for the reception of thumb screws 14 by means of which the supporting plate 10 may be clamped in position on a rear view mirror M such as is conventionally supplied as standard equipment on a vehicle.

Fixed to the support 10 and extending outwardly therefrom in a direction opposite the hooks 12 are cushions 16 and 18 respectively. These cushions are secured adjacent opposite ends of the support 10 and are provided on their sides remote from the support 10 with inclined faces 20, the purpose of which will hereinafter appear.

Secured to the support 10 as by cement 22 is one end of an elongated rectangular reflector 24 which may take the form of a conventional rectangular glass plate having a silvered back, and the reflector 24 is attached in any suitable manner adjacent its opposite end to the inclined face 20 of the cushion 16 so as to be supported in angular relation to the support 10 at an acute angle relative thereto. Secured to the support 10 adjacent and in abutting relation to the adjacent end of the reflector 24 as by cement 26 is a substantially rectangular reflector 28 of an area substantially equal to one third of the area of the reflector 24. The reflector 28 may, like the reflector 24, be formed of a substantially rectangular plate of glass having a silvered back surface and is secured adjacent the end thereof remote from the end which abuts the reflector 24 to the inclined face 20 of the cushion 18. The reflector 28 lies at an acute angle to the support 10 which is of somewhat greater magnitude than the acute angle between the support 10 and the reflector 24 and both reflectors lie at an obtuse angle relative to one another so that when the device is in place and the reflector 24 adjusted to provide a clear vision to the rear of the vehicle, the reflector 28 will be in a position to reflect other vehicles which may be overtaking and passing the vehicle on which the device is used. In this way the user may be informed as to traffic conditions both to the rear and to the side of the vehicle adjacent the steering wheel.

In the modified form of the invention a support 10' carries adjacent opposite ends cushions 16' upon which reflectors 24' are mounted as previously described. The support 10' however has attached to its face remote from that carrying the reflectors a suitable coupling unit 30 by means of which it may be attached to a support within a vehicle for adjustment both horizontally and vertically.

Obviously if so desired the reflectors 24 and 28 may be made of polished metal or any other suitable material which would produce a flat reflecting surface, and when the reflector 28 is constructed in substantially the proportions above described, adequate range of the reflector 24 is preserved and at the same time a sufficient area is provided to the side thereof in which to view objects by the side of the vehicle.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. In a side and rear view mirror an elongated substantially flat rectangular mirror support, spaced apart relatively thick wedge shaped cushions carried by the support adjacent the ends thereof, said cushions extending outwardly from one side of the support and diminishing in thickness as they recede from the end of the support toward the other end of the support, an elongated substantially rectangular rear view mirror secured adjacent one end to the support between the cushions and adjacent its opposite end to a cushion so as to lie at an acute angle to the support, and a second substantially rectangular rear view mirror equal in area to substantially one third of the area of the first mentioned elongated mirror secured adjacent one edge to the support in abutting relation to the elongated mirror and secured adjacent its opposite edge to the cushion remote from that to which the elongated mirror is secured, said last named mirror lying at an acute angle to the support and at an obtuse angle to the elongated mirror, whereby vision is affected to the side and rear of the mirror.

2. In a rear and side view mirror an elongated flat support, relatively thick cushions carried by the support adjacent each end thereof, an elongated flat substantially rectangular rear view reflector secured adjacent one end to the support intermediate the ends thereof and adjacent its opposite end to one cushion so as to lie at an angle to the support, a second flat substantially rectangular rear view reflector secured adjacent one edge to the support in abutting relation to the elongated reflector and adjacent its opposite edge to the other cushion, and attaching means carried by the support and extending from the side thereof remote from the reflectors for detachably mounting the rear and side view reflectors within a vehicle, for reflecting the views rearwardly of and at the side of the vehicle.

3. The structure recited in claim 2 in which the attaching means comprises hooks carried by the support adjacent the upper edge thereof and projecting beyond the side thereof remote from the reflectors, and thumb screws threadedly carried by the hooks for engaging a supporting panel and holding the rear view reflectors within a vehicle.

References Cited in the file of this patent

UNITED STATES PATENTS

| | | |
|---|---|---|
| 1,420,145 | Rees | June 20, 1922 |
| 1,910,119 | Moats | May 23, 1933 |
| 2,202,697 | La Hodny | May 28, 1940 |
| 2,493,546 | Orser | Jan. 3, 1950 |
| 2,514,989 | Buren | July 11, 1950 |
| 2,582,651 | Peterson | Jan. 15, 1952 |

FOREIGN PATENTS

| | | |
|---|---|---|
| 265,021 | Great Britain | Feb. 3, 1927 |